June 21, 1960 P. SCANES 2,941,402
MEASUREMENT OF FLUID FLOW
Filed March 16, 1956 2 Sheets-Sheet 1
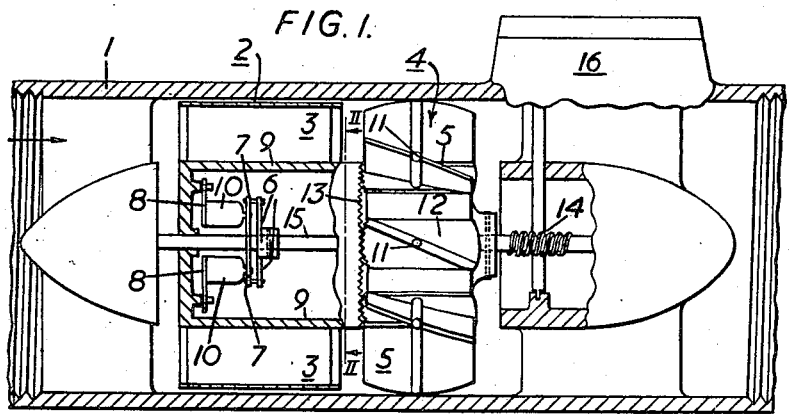
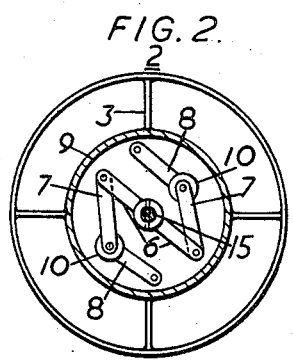
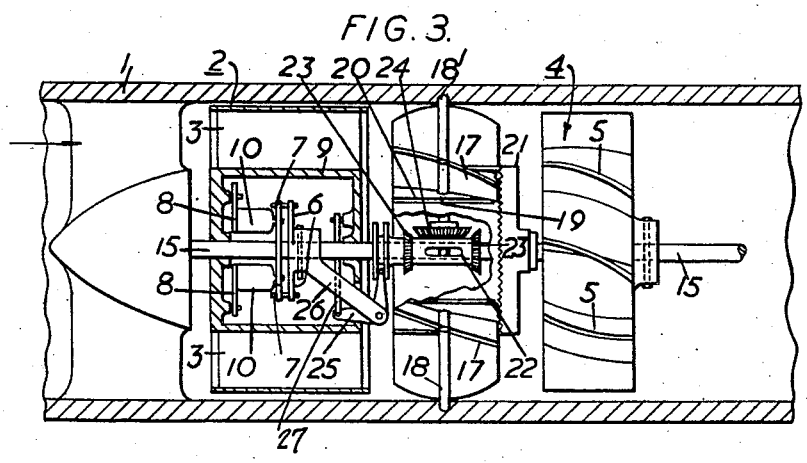
Inventor:
Percy Scanes
By: Baldwin & Wight
Attorneys June 21, 1960

P. SCANES 2,941,402

MEASUREMENT OF FLUID FLOW

Filed March 16, 1956

*Inventor:*
*Percy Scanes*
By: *Baldwin + Wight*
*Attorneys*

United States Patent Office 2,941,402
Patented June 21, 1960

2,941,402

MEASUREMENT OF FLUID FLOW

Percy Scanes, Luton, England, assignor to George Kent Limited, London, England

Filed Mar. 16, 1956, Ser. No. 571,956

Claims priority, application Great Britain Mar. 17, 1955

15 Claims. (Cl. 73—230)

This invention relates to the measurement of fluid flow and more especially to the measurement of mass flow which involves not only flow as such but also the density of the fluid constituting the flow.

The present invention makes use of the fact that, if a rotor having blades be immersed and rotated in a fluid flow with its blades parallel with the flow, the torque reaction to rotation of the rotor will be a function of the mass flow per unit time multiplied by the rate of rotation.

In accordance with this invention, the speed at which the rotor is rotated is modified by setting up a second torque which is a function of the speed of rotation of the rotor but is independent of the rate of flow of the fluid and the two torques are compared and any unbalance between them is utilized to adjust the speed of rotation of the rotor to produce a condition of balance of the torques: as will now be shown, the resulting rate of rotation will be a function of the mass flow.

Thus, if $w$ represent the angular velocity of the rotor
$m$ be the mass per unit time of the flowing fluid
$C_1$ be a constant the torque reaction $T_1$ set up on the rotor $= C_1 mw$ If a second torque $T_2$ be set up in some way such that $T_2 = C_2 w^n$ where $C_2$ and $n$ are constants, then when $T_1 = T_2$, $C_1 mw = C_2 w^n$.

From this can be derived the expression $$w = C_3 m^{\left(\frac{1}{n-1}\right)}$$

where $$C_3 = \left(\frac{C_1}{C_2}\right)^{\left(\frac{1}{n-1}\right)}$$

From this it follows that for any value of $n$ (except unity) the speed of rotation $w$ is a measure of mass flow.

In the particular case where $n=2$, the speed of rotation $w$ is directly proportional to mass flow and the total revolutions of the rotor assembly are a direct measure of total mass of liquid passing.

In general, the most useful value of the power will in fact be 2, but the principle could be applied using other values of $n$ where a different characteristic might be required to suit a particular process.

A particular application of the principle is the measurement of total mass of fluid flowing past a given point. The torque $T_2$ may be obtained from a mass rotated at an angular velocity equal or proportional to $w$ to produce a centrifugal force whence $T_2 = C_2 w^2$, and under balanced condition when $T_1 - T_2 = 0$, $w = C_3 m$.

The rotation of the rotor can be derived from the flow of the fluid or it can be derived from external power, provision being made to effect control of the speed to produce the required condition of balance of the torques $T_1$ and $T_2$ so that the total mass flow can be indicated by any of the usual integrating or totalising mechanisms at present in use.

The centrifugal torque produced on a rotating mass immersed in a fluid alters with the density of the fluid, and in those cases where the fluid density is a reasonable proportion of the density of the masses, this can measurably affect the accuracy of the system. The torque developed can be expressed as follows:

$$T_2 = C_2(d_m - d_t)w^2$$

where $d_m$ is the density of the material of the masses and $d_t$ is the density of the fluid. In the case of a liquid of specific gravity varying from 0.5 to 1.0 and masses of metal of specific gravity approaching 8, the variation in $T_2$ will vary as 7 to 7.5 as the liquid changes in specific gravity. This change can be eliminated by introducing a counter torque from masses of a different specific gravity which are linked with the heavier masses. In such an arrangement the torque $T_2$ would then consist of the combined torques due to the centrifugal forces on these two masses, and the results can be expressed as follows:

$$T_2 = [C_4(d_{m1} - d_t) - C_5(d_{m2} - d_t)]w^2$$

By suitable selection of dimensions, $C_4$ can be made equal to $C_5$ whence $T_2$ becomes equal to $$C_4(d_{m1} - d_{m2})w^2$$

By this means, the torque $T_2$ is made independent of fluid density or in other words an automatic compensation is provided for variation in the density of the fluid.

It is further possible, by suitably choosing $C_4$ and $C_5$, to retain a certain proportion of the torque which is proportional to fluid density in order to counteract certain centrifugal forces which arise in the torque drum due to the rotation of the fluid.

Three forms of construction to carry out the principle of this invention are illustrated in the accompanying drawings: in all constructions, the flow of fluid is used to drive the rotor which is used to develop the torque $T_1$, this rotor also driving the mass which is used to develop the torque $T_2$.

Figure 1 is a longitudinal sectional view through a conduit in which is mounted apparatus comprising the invention and capable of performing the method of the invention, certain of the parts of the apparatus being shown in radial section and others in elevation;

Figure 2 is a detail view, partly in end elevation and partly in section on the line II—II of Figure 1, showing a sensing rotor and driving and centrifugally responsive mechanism associated therewith;

Figure 3 is a view similar to Figure 1, but illustrating a modified construction;

Figure 4:
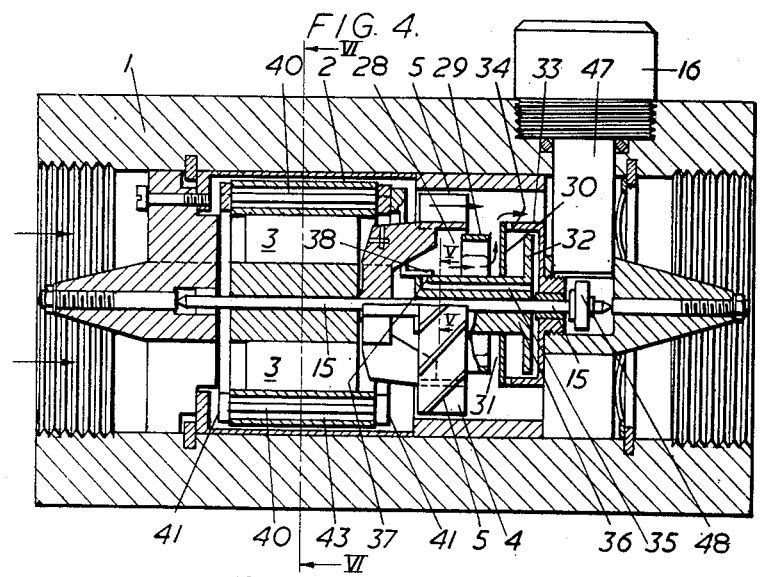
Figure 4 is another view similar to Figure 1, but showing a different modified construction.

Referring firstly to Figures 1 and 2, the conduit through which flows the fluid the mass flow of which is to be measured, is indicated at 1. In this conduit is a rotor 2 (which is responsive to the density of the fluid and is hereinafter referred to for convenience as a sensing rotor) having blades 3 which are fixed to the rotor so as to be parallel with the direction of fluid flow through the conduit.

This rotor 2 is connected with freedom to move angularly on a spindle 15 which is driven by a driving rotor 4 having blades 5. The rotation of the spindle 15 is utilized to create the torque $T_2$ and this is effected as is shown most clearly in Figure 2 by securing to the spindle arms 6 which are connected by links 7, 8 to the hub 9 of the sensing rotor 2: the links 7, 8 are pivoted together at their adjacent ends and are provided at this point with masses or components 10, this mechanism being located inside the hub 9, the linkage being so arranged that gravitational forces on the masses are balanced.

As the spindle 15 is rotated by the driving rotor 4, rotation is transmitted through the arms 6 and links 7, 8 to the sensing rotor 2 which sets up the torque $T_1$: the rotation of the mass components 10 sets up a centrifugal force which applies the torque $T_2$ to the hub 9 of the rotor 2.

When the torques $T_1$, $T_2$ are balanced, the spindle 15 and the sensing rotor 2 rotate together: when an unbalance occurs either the torque $T_1$ derived from the sensing rotor 2 or the torque $T_2$ derived from the masses 10 causes the sensing rotor 2 to move in one or the other direction relative to the spindle 15 and this relative movement is employed to adjust the speed of the spindle 15 to restore balance between the torques $T_1$, $T_2$. This is effected by mounting the driving blades 5 for angular adjustment on pivot pins 11 and by securing to the blades plates 12 having teeth in mesh with teeth 13 on the end of the hub 9 of the sensing rotor 2.

It will be clear that so long as the torques $T_1$, $T_2$ are in balance, the driving blades 5 remain set and the rotation of the spindle 15 is proportional to the mass flow of the fluid: if unbalance occurs, the speed of the spindle 15 is adjusted to restore the balance so that the rotation of the spindle 15 remains proportional to the mass flow of the fluid in the conduit 1. The rotation of the spindle can be transmitted as for example by the provision of gearing 14 by which rotation can be transmitted direct to a counter meter housed in a housing 16 or by an electrical transmission to a remote counter.

In the arrangement shown in Figures 1 and 2, the power required to effect the adjustment is derived from the joint action of the sensing rotor 2 and the centrifugal masses 10.

In Figure 3 is shown a construction in which these parts are relieved of that load so enabling greater accuracy of balance to be obtained and allowing greater accuracy to be obtained by requiring only a very small degree of relative movement. This result is achieved by providing flow guide vanes which change the incidence of the flow on the blades 5 of the driving rotor 4, the blades 5 in this case being fixed and the power operating the guide vanes being controlled by the same kind of relative movement as in Figures 1 and 2.

Thus in Figure 3, the guide vanes are indicated at 17; these vanes are mounted on pins 18 on a stationary hub 19, the vanes being fast with plates 20 having teeth in mesh with a toothed disc 21 loose on the spindle 15. A sleeve 22 rotated by but axially slidable on the spindle 15 is provided with two bevel gears 23 either of which can be moved into mesh with a crown wheel 24 on the pin $18^1$ of one of the vanes. By moving the sleeve axially from a neutral position (in which both gears 23 are out of mesh with the crown wheel 24) to bring one or other gear 23 into mesh with the crown wheel, the pin $18^1$ is turned to adjust the setting of the appropriate guide vane 17 and the other guide vanes 17 have a similar movement imparted to them through the various plates 20 and the toothed disc 21.

To place the guide vanes under the control of the torques $T_1$, $T_2$, the sleeve 22 is controlled by a lever 25 pivoted on a bracket 26 on the spindle 15, the lever 25 itself being controlled by a link 27 which is actuated by the relative angular movement between the hub 9 of the sensing rotor 2 and the spindle 15, this link being pivotally connected at one end to the hub 9 and at the other end to the lever 25. Depending on the direction of relative movement (i.e. in the sense of $T_1$ and $T_2$) the sleeve 22 is moved in a corresponding direction to cause adjustment in the corresponding sense of the guide vanes and so to restore the balance between $T_1$ and $T_2$ by increasing or decreasing the speed of the damping rotor 2.

Figure 5:
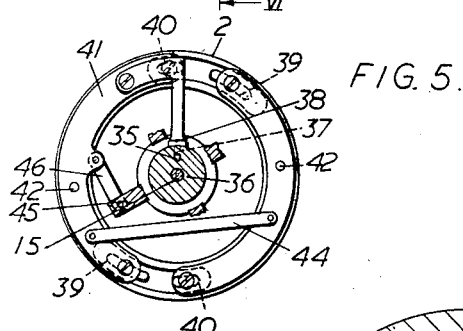
Figure 5 is a view partly in transverse section through a piston shaft boss on the line V—V of Figure 4, and partly in end elevation showing a portion of a sensing rotor and associated centrifugally operated valving mechanism.
Figure 6:
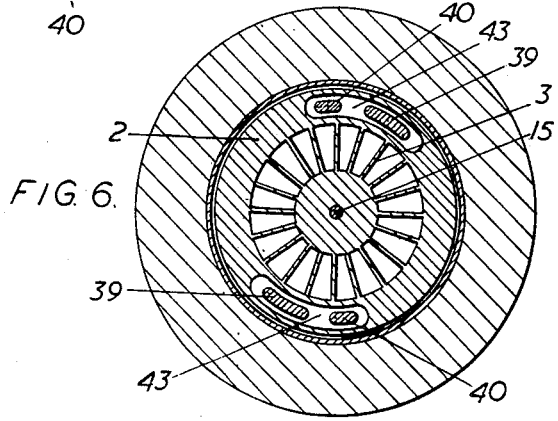
Figure 6 is a transverse sectional view on the line VI—VI of Figure 4, showing the conduit and sensing rotor shown in Figure 4.

In Figures 4–6 is illustrated a modification in which the pressure drop due to the flow of fluid being measured is used to provide the force necessary to adjust the speed of the driving rotor 4: these figures illustrate also an arrangement which provides an automatic compensation for the density of the fluid being measured in the manner which has already been theoretically considered.

In these figures, the sensing rotor is again indicated at 2, and its blades at 3 and the driving rotor again indicated at 4 has its blades 5 in fixed position.

As in the other constructions, the sensing rotor 2 is mounted for free rotation in the conduit 1 but in this construction the torque reaction $T_1$ set up by this rotor, coupled with the reaction $T_2$ set up by the centrifugal masses or components is employed to effect control by diversion of the flow of the fluid through the driving rotor 4. Thus the blades 5 of the driving rotor 4 are formed as an annulus about a central opening 28 in the rotor so that the discharge of fluid from the sensing rotor can pass through the ring of vanes 5 and through the opening 28.

The diversionary flow through the opening 28 is controlled by a ring 29 which cooperates with a plate 30 to define a diversion fluid discharge 31. The ring is fast with a piston 32 moving in a cylinder 33 (one wall of which provides the plate 30): the cylinder 33 at the opposite sides of the piston 32 is connected via an opening 34 to the downstream side of the rotor 4 and via a passage 35 formed in the shaft boss 36 carrying the piston to the upstream side of the rotor via an opening 37. Thus there is provided a pressure differential available to operate the piston 32 to control the rotation of the driving rotor 4 by controlling the diversion of fluid flow. In order to place this under the control of the torques $T_1$ and $T_2$ the opening 37 is regulated by a flap valve 38 controlled conjointly by the shift of the sensing rotor 2 (due to the density of the fluid) with respect to the shaft 15 carrying the driving rotor 4 and by the response of the centrifugal masses, which, as in the other constructions, are driven by the driving rotor 4.

The parts are such that the diversion operates to maintain the rotation of the driving rotor 4 proportional to the mass flow of the fluid as in the other constructions.

The centrifugal masses in this construction are also of a modified form. Two rotating systems of mass are used and each system comprises a mass 39 arranged at the ends of levers 41 pivoted at 42 to the sensing rotor 2 near its outer periphery, the masses extending through openings 43 formed in the outer wall of the rotor. The levers 41 are connected together by links 44 to ensure that they move together under the effect of centrifugal force, and rotation of the masses and of the sensing drum 2 is effected through an arm 45 secured to the driving rotor shaft 15 connected by a link 46 to the levers 41 of only one of two mass systems.

The connection of the link 45 to the lever 41 is offset from the pivoting point 42 of the lever so that firstly the link will be caused to rock as the result of drag on the sensing rotor 2 and the action of centrifugal force on the masses 39: in the result therefore, the lever 41 takes up a position related to the difference of the two factors $T_1$, $T_2$ and this is applied to the flap valve 38 by supporting that valve from one of the two levers 41.

In order to eliminate or at least to reduce the tendency of change in density on the centrifugal torque developed, each system of mass has a second mass 40 of a different specific gravity from that of the mass 39, the two masses 39, 40 being disposed at opposite ends of the levers 41. One mass of each system could be formed of say brass, this mass forming the main mass giving rise to the torque $T_2$ while the other mass could be of say a plastic material the main function of which is to give a compensatory action for variation in density as has already been demonstrated theoretically in the foregoing.

In the construction shown in Figure 4, the counter 16 is shown arranged for electrical operation by a switch in a sealed case 47 the switch being actuated magnetically by a magnet 48 on the driving rotor spindle 15.

It will be seen that in all of the constructions the speed of the rotor 4 is automatically adjusted until torque balance is obtained, and is thus independent of the characteristics of the driving rotor relative to velocity of the liquid driving it.

It is not essential to use a driving rotor 4 (driven by the fluid flow) for the purpose of driving the sensing rotor 2 by which the torque $T_1$ is developed. Thus, an external source of power can be used to drive the measuring spindle 15, the deviations of the sensing rotor 2 relative to the shaft 15 or the deviation of any part of the torque balance system from the point of balance being used to control the speed of the external power source. Thus, an electrical motor could be used to drive the spindle through a suitable seal in the meter casing and movement of the bevel wheel 11 could be used to control the position of a rheostat or similar speed controller in the motor circuit. As before, under conditions of balanced torques, the motor speed would then be proportional to the mass flow of the liquid passing.

The principle of the present invention, which resides not only in the principle but also in apparatus to carry it into practical effect, enables accurate measurement of mass flow to be obtained in a simple manner without the necessity of employing parts specially characterised to obey empirical relationships or the necessity of combining values obtained from two separate measuring systems.

I claim:

1. To measure the mass flow of a fluid, apparatus comprising a conduit for fluid flow, a rotor disposed in the fluid flowing in the conduit and having blades disposed parallel to the direction of flow of the fluid, means other than the rotor itself to rotate the rotor including control means connected to the rotor responding to the torque reaction of rotation of the rotor, means connected to said control means and transmitting thereto a second torque which is a function of the rate of rotation of the rotor and which opposes the torque reaction to rotation of the rotor, and means responsive to operation of said control means and said means connected to said control means for regulating the rate of rotation of the rotor to maintain the torques in a condition of balance whereby the rate of rotation of the rotor is a function of the rate of mass flow of the fluid.

2. Apparatus as claimed in claim 1 and wherein the means for transmitting said second torque to said control means comprises a system of centrifugally displaceable mass rotated at a speed proportional to the rate of rotation of the rotor.

3. Apparatus as claimed in claim 2 and wherein said control means connected to said rotor comprises a yieldable coupling device, and wherein said means connected to said control means and transmitting said second torque thereto is constituted by said system of centrifugally displaceable mass.

4. Apparatus as claimed in claim 1 and wherein the rotor rotating means comprises a second bladed rotor disposed in the conduit to be rotated by the fluid flow.

5. Apparatus as claimed in claim 4 and wherein the second rotor has movable blades and wherein the control means effects regulation of the rate of rotation of the first rotor by moving the blades of the second rotor.

6. Apparatus as claimed in claim 4 and wherein the second rotor has fixed blades and wherein in the conduit are disposed movable deflecting vanes to control the incidence of flow of fluid on to the blades of the second rotor, the control means effecting regulation of the rate of rotation of the rotor by movement of the deflecting vanes.

7. Apparatus as claimed in claim 4 including means for variably diverting fluid flow from said second rotor thereby to vary the rotation thereof by the fluid flow, and means operable by said control means for regulating said fluid flow diverting means.

8. Apparatus as claimed in claim 1 and wherein the control means effects control by power derived from the flow of fluid.

9. Apparatus as claimed in claim 8 and having a component which is displaceable by the pressure difference between two displaced points in the length of the conduit, the said component effecting by its movement control of the rate of rotation of the rotor and its displacement being regulated by the control means acting to regulate the pressure difference applied to the component.

10. In apparatus for measuring the mass flow of a fluid, a conduit for fluid flow; a first rotor mounted for rotation in the fluid flowing through the conduit and having means contactable with the flowing fluid for variably opposing rotation of said first rotor in dependence upon the density of the fluid, but said first rotor being in itself unresponsive to contact of the flowing fluid with said first rotor for being rotated; a second rotor disposed within said conduit and being rotatable in response to flow of fluid through said conduit in contact with said second rotor; means for transmitting rotational drive from said second rotor to said first rotor against the opposition to rotation of said first rotor dependent upon the density of said fluid; and centrifugal force actuatable means responsive to the speed of rotation of said first rotor by said second rotor for varying the speed of the rotation of said second rotor by said flow of fluid, whereby the speed of rotation of said rotors is automatically adjusted to be a function of the rate of mass flow of the fluid.

11. Apparatus as claimed in claim 10 including second rotor blades and means mounting said second rotor blades on said second rotor for movement thereon to different angles relative to the direction of flow of the fluid, and wherein there is provided means connecting said centrifugal force actuatable means to said second rotor blades for varying their angular setting in dependence on the rate of rotation of the first rotor.

12. Apparatus as claimed in claim 10 comprising a counter and means to transmit drive from one of said rotors to said counter.

13. In apparatus for measuring the mass flow of a fluid, a conduit for fluid flow; a first rotor mounted for rotation in the fluid flowing through the conduit and having means contactable with the flowing fluid for variably opposing rotation of said first rotor in dependence upon the density of the fluid, but said first rotor being in itself unresponsive to contact of the flowing fluid with said first rotor for being rotated; a second rotor disposed within said conduit and being rotatable in response to flow of fluid through said conduit in contact with said second rotor; means for transmitting rotational drive from said second rotor to said first rotor against the opposition to rotation of said first rotor dependent upon the density of said fluid with provision for relative rotational movement between said first and second rotors, said rotational drive transmitting means including centrifugal force actuatable means responsive to the speed of rotation of said first rotor by said second rotor; and means operable conjointly by said centrifugal force actuatable means and the opposition to rotation of said first rotor dependent upon the density of the fluid for varying the speed of rotation of said second rotor by said flow of fluid, whereby the speed of rotation of said rotors is automatically adjusted to be a function of the rate of mass flow of fluid.

14. In a method for measuring the mass flow of fluid, rotating a bladed rotor in the flowing fluid against opposition to rotation of said rotor by contact of its blades with the flowing fluid thereby to produce a reaction torque dependent upon the fluid density; creating a second torque which is a function of the rate of rotation of the rotor; balancing the two torques against one another; and applying any unbalance of the two torques to adjust the speed of rotation of the rotor, whereby said speed of rotation of the rotor is a function of the rate of mass flow of the fluid.

15. In a method as set forth in claim 14, applying the rotation of said rotor to drive a summation counter for registering the quantity of mass flow.

References Cited in the file of this patent

UNITED STATES PATENTS

| | | |
|---|---|---|
| 2,097,360 | Andrew | Oct. 26, 1937 |
| 2,324,606 | Wagner | July 20, 1943 |
| 2,472,609 | Moore | June 7, 1949 |
| 2,896,084 | MacDonald | July 21, 1959 |

FOREIGN PATENTS

| | | |
|---|---|---|
| 185,059 | Germany | May 16, 1907 |